H. T. DAVIS.
Quilting-Frame.
No. 217,203. Patented July 8, 1879.
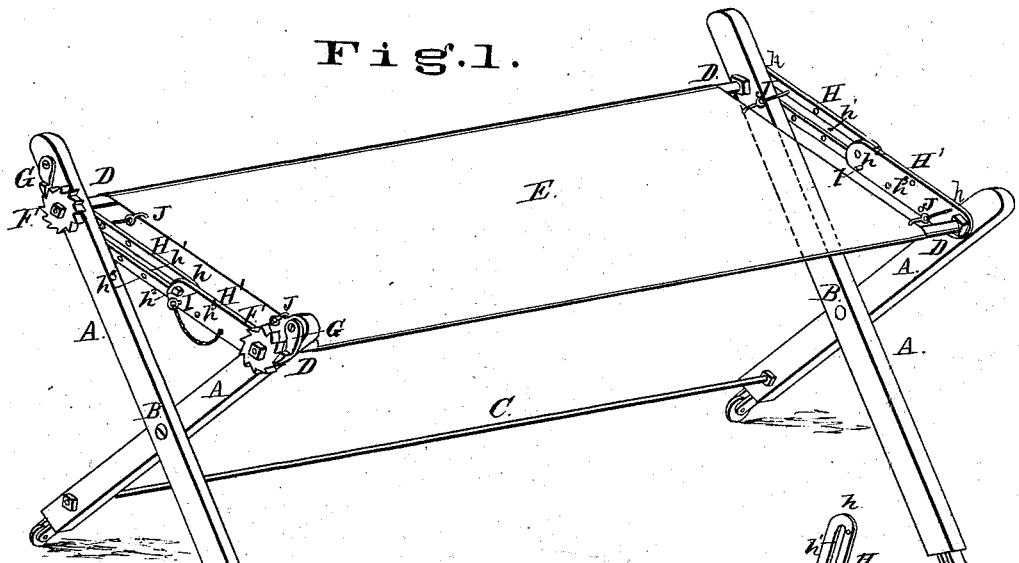
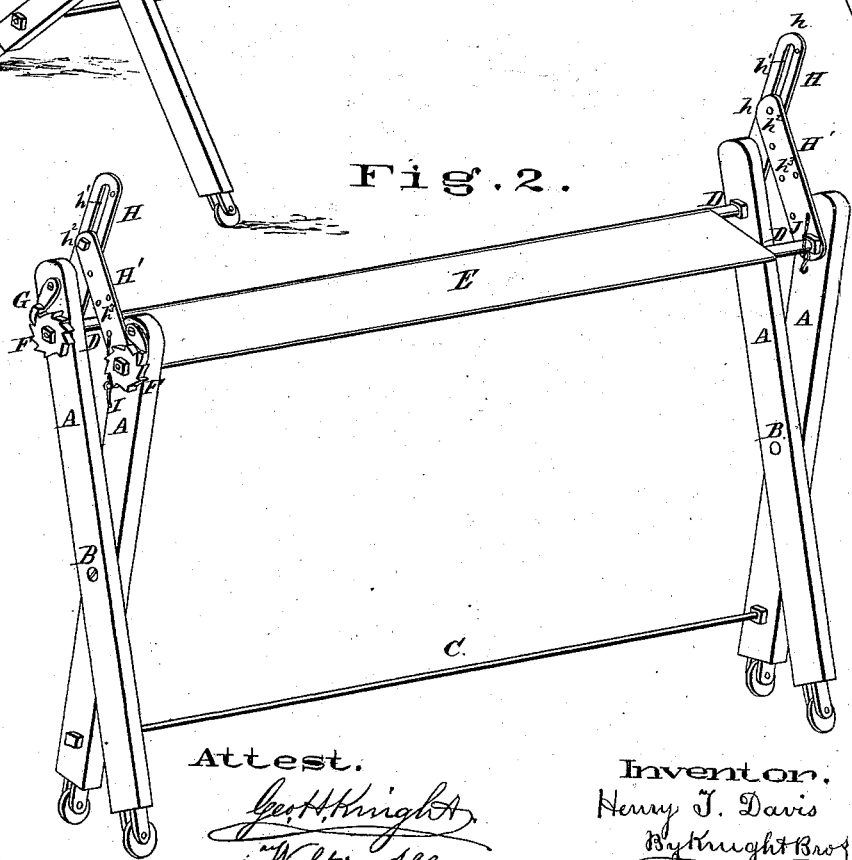
Attest.
Geo. H. Knight
Walter Allen
Inventor.
Henry T. Davis
By Knight Bros
Attys

UNITED STATES PATENT OFFICE.

HENRY T. DAVIS, OF SHERMAN, TEXAS.

IMPROVEMENT IN QUILTING-FRAMES.

Specification forming part of Letters Patent No. 217,203, dated July 8, 1879; application filed April 10, 1879.

*To all whom it may concern:*

Be it known that I, HENRY T. DAVIS, of Sherman, in the county of Grayson and State of Texas, have invented a certain new and useful Improvement in Quilting-Frames, of which the following is a full, clear, and exact description, reference being had to the accompanying drawings, forming part of this specification.

My improvement relates to that class of quilting-frames made with folding ends and adjustable in width.

My invention consists in the combination of pivoted end bars and adjustable braces, by which the pivoted bars of the end frames are connected at top, said braces consisting of two arms having hinge-connection with the end bars, and one of which is slotted longitudinally, said slot being occupied by a bolt which passes through the end of the other arm. The end frames are held in any desired position (more or less open) by pins, which pass through any of a series of holes in the arms.

In the drawings, Figure 1 is a perspective view showing the frame open for use. Fig. 2 is a perspective view showing it folded together in condition to be stowed away.

The ends are cross-frames, consisting each of two bars, A A, pivoted together at or near the middle by pivot pin or bolt B, so that the ends can be spread asunder, as in Fig. 1, or held together, as in Fig. 2.

The bars or legs A are provided with casters to enable the frame to be readily moved about. These are more especially necessary because my quilting-frame is intended for use with sewing-machines, and in this case it is necessary that the quilt should be capable of ready movement upon the cloth-plate of the machine.

The end frames are connected together by three longitudinal bars—namely, a fixed bar, C, below and two turning bars, D D, at top.

The bars D are constructed for the attachment to them of the quilt E, which is coiled upon them and stretched between the bars. Upon the ends of the bars D are ratchet-wheels F, which are fixed to the turn-bars, and are engaged by dogs G, to prevent the bars turning and the quilt uncoiling from the bar.

H H' are braces or struts, whose outer ends, $h$, turn upon the bars as pivots, so as to enable their inner ends to rise and fall, and to allow the ends of the frame to be spread open more or less when the arms H H' are in a horizontal position, as in Fig. 1.

The arm H has in it a longitudinal slot, $h^1$, in which works a bolt, $h^2$, that passes through the end of the arm H'. These arms H H' are drilled with a number of pin-holes, $h^3$, into any two of which a pin, I, is inserted to keep the arms H H' from sliding upon each other, and to thus hold the bars D asunder.

The described adjustable connection H H', besides allowing the frame to be spread out, as in Fig. 1, and folded, as in Fig. 2, allows the quilt to be vertically adjusted to the height of any sewing-machine, for it will be understood that as the distance between the two bars D D diminishes the quilt attains a higher elevation, and vice versa.

It will be seen that the lower ends of the end frames are only connected together at one side, (by a rod, C,) so that the space upon the other side is left open to allow the approach of the frame to a sewing-machine and the free movement of the frame as may be required in the sewing of the quilt.

At J are shown springs, of rubber or other elastic material. These springs are attached to the arms H H', and have at their ends hooks to engage the quilt at the edge, so as to keep it stretched.

Having fully described my invention, what I claim as new, and desire to secure by Letters Patent, is—

The combination, in a quilting-frame, of the pivoted end bars, A, brace-arms H H', the arm H being slotted, while H' is plane, and is connected by bolt $h^2$ to the arm H, and works in the slot $h^1$, said arms having adjusting pin-holes to receive a locking-pin, I, substantially as set forth.

HENRY T. DAVIS.

Witnesses:
 SAML. KNIGHT,
 GEO. H. KNIGHT.